(12) United States Patent
Minas

(10) Patent No.: US 12,351,337 B2
(45) Date of Patent: Jul. 8, 2025

(54) SUB-COOLERS FOR REFUELING ONBOARD CRYOGENIC FUEL TANKS AND METHODS FOR OPERATING THE SAME

(71) Applicant: General Electric Company, Schenectady, NY (US)

(72) Inventor: Constantinos Minas, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 436 days.

(21) Appl. No.: 17/531,263

(22) Filed: Nov. 19, 2021

(65) Prior Publication Data

US 2023/0159185 A1    May 25, 2023

(51) Int. Cl.
  *B64F 1/28*   (2006.01)
  *B64D 37/30*  (2006.01)
  *F17C 7/04*   (2006.01)

(52) U.S. Cl.
  CPC .................. *B64F 1/28* (2013.01); *F17C 7/04* (2013.01); *B64D 37/30* (2013.01); *F17C 2223/0161* (2013.01); *F17C 2250/0631* (2013.01)

(58) Field of Classification Search
  CPC ...... B64F 1/28; F17C 7/04; F17C 2223/0161; F17C 2250/0631; F17C 9/00; F17C 9/02; F17C 9/04; B64D 37/30; B64D 37/06; B64D 37/34; F25B 40/02; F25B 41/20; F25B 41/40; F25B 49/00
  See application file for complete search history.

(56) References Cited

U.S. PATENT DOCUMENTS 2,033,094 A * 3/1936 De Motte ................. F17C 9/00
                                                220/586
4,965,731 A * 10/1990 Weitz, Jr. ................. B64F 1/28
                                                701/123

(Continued)

FOREIGN PATENT DOCUMENTS

DE    4445183     9/1995
EP    2923948 A1  9/2015

(Continued)

OTHER PUBLICATIONS

United States Patent and Trademark Office, "Non-Final Office Action," issued in connection with U.S. Appl. No. 17/836,681, dated Apr. 12, 2023, 13 pages.

(Continued)

*Primary Examiner* — Jianying C Atkisson
*Assistant Examiner* — Ibrahim A. Michael Adeniji
(74) *Attorney, Agent, or Firm* — Hanley, Flight & Zimmerman, LLC

(57) ABSTRACT

A sub-cooler for a sub-cooling cryogenic refueling system is disclosed herein. The sub-cooler includes a first valve to separate flowing cryogenic fuel into a primary flowline and an auxiliary flowline, a second valve to reduce the saturated pressure and temperature of the cryogenic fuel in the auxiliary flowline, a cryogenic heat exchanger to transfer heat from the primary flowline to the auxiliary flowline, a temperature sensor to measure the temperature of the sub-cooled cryogenic fuel in the primary flowline, and a sub-cooler controller to control the effective areas of the primary flowline inlet and the auxiliary flowline inlet at the first valve.

18 Claims, 9 Drawing Sheets

(56) References Cited

U.S. PATENT DOCUMENTS

| | | | |
|---|---|---|---|
| 5,048,597 A | 9/1991 | Bond | |
| 6,595,048 B1* | 7/2003 | Drube | G01F 1/88 73/195 |
| 6,907,735 B2 | 6/2005 | Wolff | |
| 7,287,558 B2 | 10/2007 | Hobbs | |
| 7,360,563 B2 | 4/2008 | Mitlitsky | |
| 8,372,554 B2 | 2/2013 | Hoffjann et al. | |
| 8,789,379 B2 | 7/2014 | Watts | |
| 8,950,195 B2 | 2/2015 | Watts | |
| 9,064,401 B2 | 6/2015 | Grant et al. | |
| 10,179,308 B2 | 1/2019 | Schaeffer et al. | |
| 10,415,756 B2 | 9/2019 | Moddemann | |
| 10,466,722 B2 | 11/2019 | Mortensen et al. | |
| 11,072,023 B2 | 7/2021 | Conrad et al. | |
| 11,241,653 B2 | 2/2022 | Claris | |
| 11,544,161 B1 | 1/2023 | Yarlagadda et al. | |
| 12,135,149 B2* | 11/2024 | Lantz | F25B 39/02 |
| 2003/0146106 A1 | 8/2003 | Mitlitsky | |
| 2005/0000802 A1 | 1/2005 | Hobbs | |
| 2006/0289076 A1* | 12/2006 | Jang | F17C 5/00 62/50.7 |
| 2007/0227160 A1 | 10/2007 | Johnson | |
| 2009/0217701 A1* | 9/2009 | Minta | F25J 1/0288 62/612 |
| 2010/0028741 A1 | 2/2010 | Hoffjann et al. | |
| 2010/0287955 A1 | 11/2010 | Watts | |
| 2012/0156059 A1 | 6/2012 | Watts | |
| 2013/0125568 A1* | 5/2013 | Chalk | F04D 29/584 62/126 |
| 2015/0204595 A1* | 7/2015 | Sunderland | F25B 25/005 165/295 |
| 2016/0161058 A1 | 6/2016 | Moddemann | |
| 2017/0146267 A1 | 5/2017 | Conrad et al. | |
| 2017/0248975 A1 | 8/2017 | Mortensen et al. | |
| 2017/0296965 A1 | 10/2017 | Schaeffer et al. | |
| 2018/0180329 A9 | 6/2018 | Conrad et al. | |
| 2019/0024926 A1* | 1/2019 | Kim | G05B 19/042 |
| 2019/0078818 A1* | 3/2019 | Khaled | F25B 41/34 |
| 2020/0156923 A1* | 5/2020 | Li | B67D 7/36 |
| 2020/0164307 A1 | 5/2020 | Claris | |
| 2020/0326113 A1* | 10/2020 | Donovan | F25B 6/04 |
| 2021/0062974 A1 | 3/2021 | Tezuka et al. | |
| 2022/0009648 A1* | 1/2022 | Clarke | F17C 1/00 |
| 2022/0107057 A1 | 4/2022 | Lysenkov | |
| 2022/0107075 A1 | 4/2022 | Lenicky et al. | |
| 2022/0120486 A1* | 4/2022 | Kim | F04D 27/0238 |
| 2022/0290613 A1 | 9/2022 | Morenko et al. | |
| 2022/0381183 A1 | 12/2022 | Smith | |
| 2023/0089372 A1* | 3/2023 | Manousiouthakis | F17C 5/06 |
| 2023/0348089 A1 | 11/2023 | Rawdon et al. | |

FOREIGN PATENT DOCUMENTS

| | | |
|---|---|---|
| GB | 2295858 | 6/1996 |
| KR | 20210125123 A | 10/2021 |
| WO | 2006032873 A1 | 3/2006 |

OTHER PUBLICATIONS

Ursan, "What is Boil-Off", LNG Task Force meeting, Brussels, BE, 2011, 5 pages.

Armstrong Flight Research Center, "Cryogenic Liquid Level Sensor Apparatus and Method," Tech Briefs, Engineering Solutions for Design and Manufacturing, Sep. 1, 2016, 4 pages.

United States Patent and Trademark Office, "Final Office Action," issued Oct. 6, 2023 in connection with U.S. Appl. No. 17/836,681, 15 pages.

United States Patent and Trademark Office, "Non-Final Office Action," issued on May 8, 2024 in connection with U.S. Appl. No. 17/836,681, 23 pages.

Furey, Edward, "Tank Volume Calculator," Calculator Soup, https://www.calculatorsoup.com/calculators/construction/tank.php, retrieved from Wayback Machine Archive, snapshot dated May 15, 2021 (Year: 2021).

United States Patent and Trademark Office, "Final Office Action," issued in connection with U.S. Appl. No. 17/836,681, dated Oct. 7, 2024, 31 pages.

\* cited by examiner

SUB-COOLERS FOR REFUELING ONBOARD CRYOGENIC FUEL TANKS AND METHODS FOR OPERATING THE SAME

FIELD OF THE DISCLOSURE

This disclosure relates generally to refueling cryogenic fuel tanks, and, more particularly, to a sub-cooling system for refueling onboard cryogenic fuel tanks.

BACKGROUND

A refueling system for cryogenic fuel tanks generally includes a supply tank and/or trailer, a flow control valve, a volumetric flowmeter, a cryogenic valve, a flexible vacuum jacketed flowline, and an onboard cryogenic fuel tank. To begin refueling, the supply tank initiates the flow of a cryogenic fuel through a series of vacuum jacketed flowlines terminating at the onboard cryogenic fuel tank. The flow control valve regulates the flowrate of the cryogenic fuel leaving the supply tank. The volumetric flowmeter measures the rate at which the cryogenic fuel flows through the flowmeter, e.g., in liters per second. The cryogenic valve generally regulates the cryogenic fuel flow with fully open or fully closed positions. The supply tank has a temperature gauge, and the cryogenic fuel has density properties dependent on the cryogenic fuel's temperature. The density of the cryogenic fuel can be determined based on the temperature of the fuel. The volume of the cryogenic fuel supplied to the onboard cryogenic fuel tank can be determined based on the volumetric flowrate and the duration of refueling. The mass of the cryogenic fuel supplied to the onboard cryogenic fuel tank can be determined based on the volume and density of the cryogenic fuel.

BRIEF DESCRIPTION OF THE DRAWINGS

A full and enabling disclosure of the preferred embodiments, including the best mode thereof, directed to one of ordinary skill in the art, is set forth in the specification, which makes reference to the appended Figures, in which.

Figure 1:
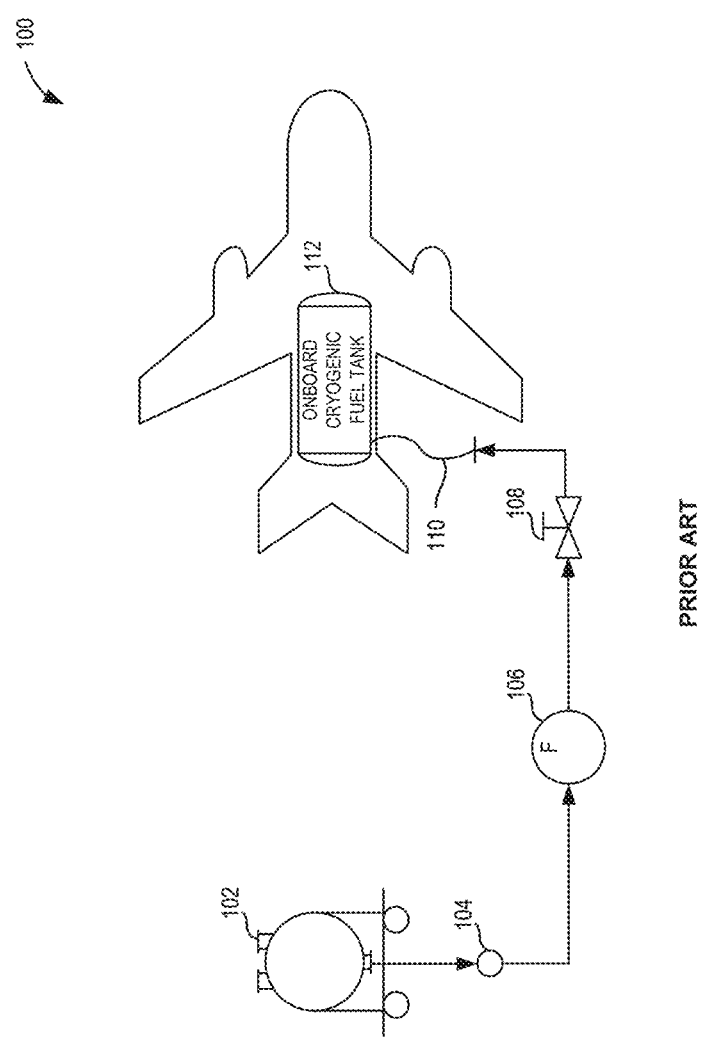
FIG. 1 illustrates a known system for refueling an onboard cryogenic fuel tank.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The operations of known refueling systems for onboard cryogenic fuel tanks refuel cryogenic fuels at temperatures similar to the temperatures at which the cryogenic fuels are stored prior to refueling. In some examples, a cryogenic fuel is stored in a supply tank at a temperature corresponding to a saturated pressure that is above atmospheric pressure. In such examples, the cryogenic fuel would also be stored at saturated pressures above atmospheric pressure in an onboard cryogenic fuel tank. The high saturated pressure can result in catastrophic damage to a vehicle powered by a liquid cryogen (e.g. a hydrogen aircraft) if the onboard cryogenic fuel tank were to malfunction or be punctured in flight. In some examples, a supply tank is driven to a take-off and/or a launch site to refuel the onboard tank with cryogenic fuel (e.g., liquid hydrogen (LH2)). In such examples, the LH2 is stored in an insulated supply tank but the temperature of the LH2 is still unregulated, in which case the mass of the onboard LH2 is neither controllable nor functionally optimized. In examples disclosed herein, a sub-cooler in refueling system for a hydrogen aircraft reduces the temperature and increases the density of LH2 during refueling such that smaller onboard cryogenic fuel tank(s) can be used to store the same mass of LH2, and the mass of LH2 supplied to the onboard cryogenic fuel tank(s) can be precisely controlled. For example, if LH2 is provided by a supply tank at 25 Kelvin (K), the density of the LH2 fuel would be about 64 kg/m$^3$ onboard an example hydrogen aircraft. The example sub-cooler disclosed herein can reduce the temperature of the LH2 to 20 K while refueling, thus increasing the density of LH2 to about 71 kg/m$^3$ and reducing the onboard tank volume by about 10%.

The terms "upstream" and "downstream" refer to the relative direction with respect to fluid flow in a fluid pathway. For example, "upstream" refers to the direction from which the fluid flows, and "downstream" refers to the direction to which the fluid flows. The terms "primary" and "auxiliary" refer to the endpoints of the respective flowlines. For example, "primary" refers to the flowline that directs sub-cooled cryogenic fuel to the onboard cryogenic fuel tank(s), and "auxiliary" refers to the flowline that directs unused cryogenic fuel to a storage tank. The term "saturated pressure" refers to the pressure at which a given cryogenic liquid and its vapor can co-exist in thermodynamic equilibrium within a confined container.

In some examples used herein, "including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

For the figures disclosed herein, identical numerals indicate the same elements throughout the figures. The example illustration of FIG. 1 is a block diagram representing a prior cryogenic refueling system 100. As shown in FIG. 1, the cryogenic refueling system 100 ("system 100") includes components connected in series by coupled vacuum-jacketed (VJ) flowlines 110. In general, the cryogenic refueling system 100 may include a manually operated or electronically actuated flow control valve 104 (e.g., cryogenic globe valve) to regulate flow of the cryogenic fuel being provided by a supply tank 102.

The flow control valve 104 operates at working temperatures lower than 233 K and may be used for transmitting low temperature cryogenic fluid (e.g., liquefied natural gas, liquid oxygen, liquid hydrogen, etc.). In some examples, the flow control valve 104 regulates the flow of the cryogenic fluid such that a known mass of fuel can be provided to an onboard cryogenic fuel tank 112. The example flow control valve 104 is constructed to thermally insulate the cryogenic fuel during transmission so that the fluid does not heat up, vaporize, and leak out as a gas. In some examples, the flow control valve 104 is connected to the supply tank 102 by one or more VJ flowlines 110.

The example cryogenic refueling system 100 may further include a manually operated or electronically actuated cryogenic valve 108. In some examples, the cryogenic valve is a shut-off valve to quickly terminate flow to the onboard cryogenic fuel tank 112 such that the onboard cryogenic fuel tank 112 does not overfill. The example cryogenic valve 108 is constructed to thermally insulate the cryogenic fuel during transmission so that the fluid does not heat up, vaporize, and leak out as a gas. In some examples, the cryogenic valve 108 is connected to the onboard cryogenic fuel tank 112 by one or more VJ flowlines 110.

In some examples, the VJ flowlines 110 illustrated in FIG. 1 are used to connect the components of the cryogenic refueling system 100. The VJ flowlines 110 of the example cryogenic refueling system 100 maintain the temperatures of cryogenic fluids so the fluids do not heat up and leak out of the system 100 as gases. In some examples, the VJ flowlines 110 can include VJ pipes, flexible lines, VJ valves, vapor vents, vapor vent heaters, VJ manifolds, etc. In general, the example VJ flowlines 110 include an inner and an outer pipe or line. The inner pipe of the example VJ flowlines 110 carries the cryogenic liquid and is insulated with multiple alternating layers of a heat barrier and a non-conductive spacer. The insulating layers create a space between the inner and outer pipes in the example VJ flowlines 110 that is depressurized using a vacuum pump to create a static vacuum shield. The vacuum shield safeguards the example cryogenic fuel from heat transfer due to conduction, convection, and radiation.

The example cryogenic refueling system 100 illustrated in FIG. 1 includes a flowmeter 106. In some examples, the flowmeter 106 is a cryogenic flowmeter that measures the volumetric flowrate of the cryogenic fuel over multiple time periods. The term time period refers to the length of time over which the example cryogenic flows at a particular volumetric flowrate. The volume of the example cryogenic fuel supplied to the onboard cryogenic fuel tank 112 is determined by aggregating volumetric flowrates multiplied by the corresponding time periods for the duration of refueling. The density of the example cryogenic fuel supplied to the onboard cryogenic fuel tank 112 is a thermodynamic property dependent on the temperature of the cryogenic fuel. Since the example VJ flowlines 110 prevent the cryogenic fuel from absorbing heat during the refueling process, the temperature at which the cryogenic fuel is stored in the supply tank 102 is similar to the temperature at which the cryogenic fuel is stored on the onboard cryogenic fuel tank 112. Therefore, the density of the example cryogenic fuel within the onboard cryogenic fuel tank 112 can be determined at multiple occurrences during the refueling process either from a temperature reading of the onboard cryogenic fuel tank 112 or the supply tank 102. The example flowmeter 106, thereby allows determination of cryogenic fuel mass stored in the onboard cryogenic fuel tank 112. However, the density and mass of the example cryogenic fuel in the onboard cryogenic fuel tank 112 is dependent on the temperature of the cryogenic fuel within the supply tank 102, which is generally not adjustable. For example, the supply tank 102 can be filled at a liquid cryogen industrial facility with LH2 at 20 Kelvin (K) prior to transporting the cryogenic fuel to the hydrogen aircraft for refueling. The example LH2 temperature of 20 K correlates to an example LH2 saturated pressure of 14 pounds per square inch (psi), which is similar to atmospheric pressure and is therefore a desired saturated pressure for example LH2 stored in the onboard cryogenic fuel tank 112. However in transit, the example temperature of LH2 within the supply tank 102 could increase to a temperature of 24 K. The example LH2 temperature of 24 K correlates to an example LH2 saturated pressure of 40 psi, which can be an undesirable saturated pressure for stored LH2 in the onboard cryogenic fuel tank 112.

As shown in FIG. 1, the example onboard cryogenic fuel tank 112 is located on a hydrogen aircraft to supply liquid or gaseous hydrogen to modified gas-turbine engine(s). The example hydrogen-powered turbine engine(s) combust a mixture of hydrogen fuel and compressed air to generate thrust. The example onboard cryogenic fuel tank 112 used to store cryogenic fuel (e.g., LH2) has thicker walls and made of stronger alloys than non-cryogenic fuel tanks to avoid brittle cracking. The example onboard cryogenic fuel tank 112 stores cryogenic fuel at low temperatures (e.g., 20 K) relative to non-cryogenic fuel tanks. The example onboard cryogenic fuel tank 112 thermally insulates the cryogenic fuel to prevent temperature increases (e.g., from 20 K to 24 K) which can cause boil-off and saturated pressure increases (e.g., from 14 psi to 40 psi). The onboard cryogenic fuel tank 112 of this example can be up to four times larger in volume than non-cryogenic fuel tanks due to a fundamentally different insulating architecture relative to non-cryogenic fuel tanks (e.g., a vacuum layer between an inner and outer container). In many liquid cryogen-fueled vehicles (e.g., hydrogen aircraft) reducing the volume of the onboard cryogenic fuel tank 112 (e.g., from 20 m$^3$ to 18 m$^3$) can increase storage capacity, passenger capacity, cargo weight limit, etc.

Figure 2A:
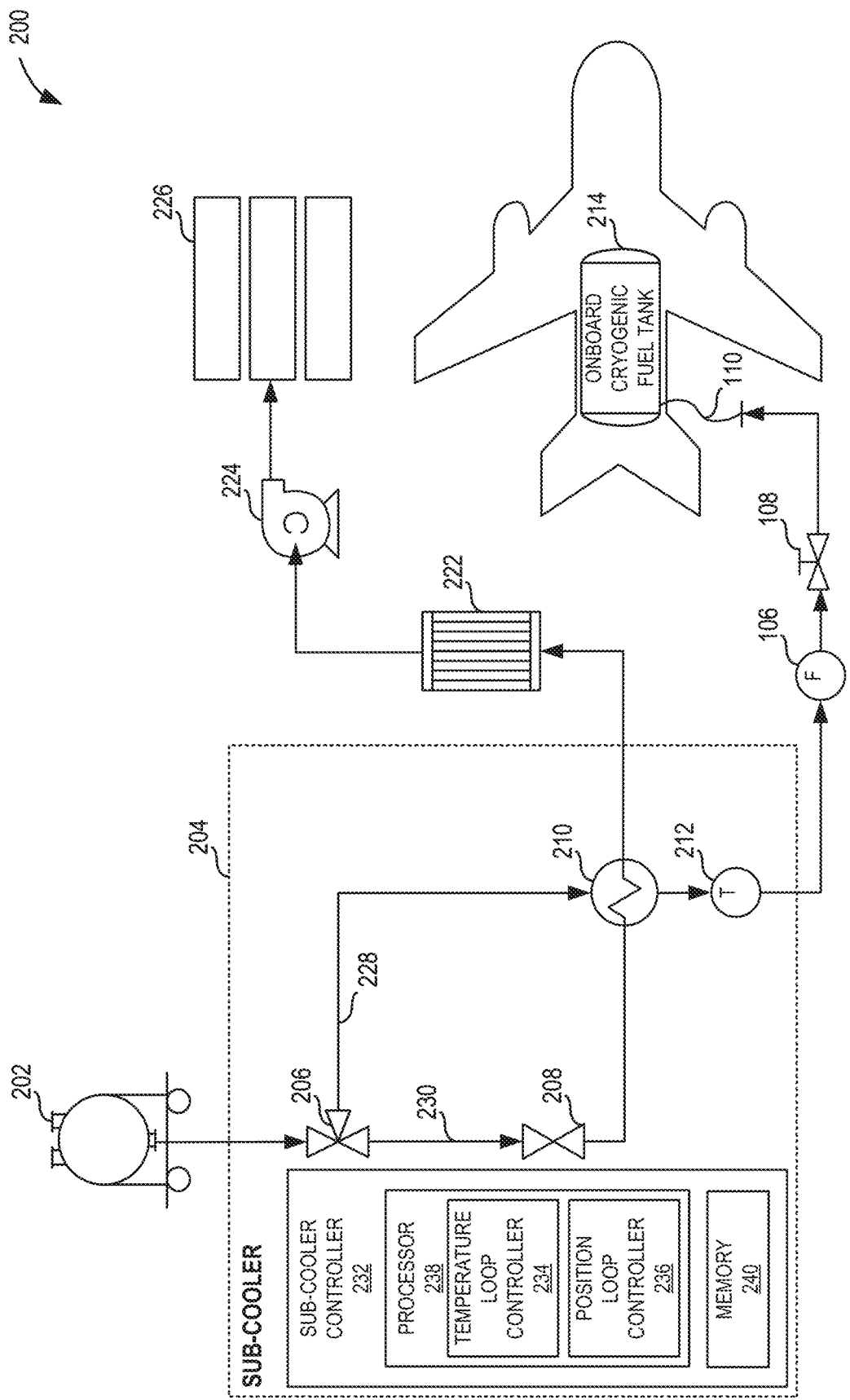
FIG. 2A illustrates a first example sub-cooling system for refueling an onboard cryogenic fuel tank in accordance with the teachings of this disclosure.

FIG. 2A illustrates a sub-cooling cryogenic refueling system 200 ("system 200") that includes a sub-cooler 204. The example sub-cooler 204 can be used in conjunction with the cryogenic refueling system 100 of FIG. 1, in place of the flow control valve 104, and with additional and/or alternative components such as a vaporizer 222, a compressor 224, a storage tank 226, etc. In the illustrated example of FIG. 2A, the sub-cooler 204 includes a first valve 206, a second valve 208, a cryogenic heat exchanger 210, and a temperature sensor 212. In the illustrated example of FIG. 2, the sub-cooling cryogenic refueling system 200 includes a supply tank 202, a flowmeter 106, a cryogenic valve 108, VJ flowlines 110, an onboard cryogenic fuel tank 214, the vaporizer 222, the compressor 224, and the storage tank 226.

The example sub-cooler 204 illustrated in FIG. 2A includes a first valve 206 to separate the flowing cryogenic fuel into a primary flowline 228 and an auxiliary flowline 230. The example first valve 206 can vary the volumetric flowrate into the primary flowline 228 and auxiliary flowline 230. The example sub-cooler 204 further includes a second valve 208 to reduce the saturated pressure of the cryogenic fuel in the auxiliary flowline 230, thereby reducing the temperature of the cryogenic fuel flowing through the auxiliary flowline 230. The example sub-cooler 204 further includes a cryogenic heat exchanger 210 to transfer heat from the warmer cryogenic fuel in the primary flowline 228 to the cooler cryogenic fuel in the auxiliary flowline 230. The example sub-cooler 204 further includes a temperature sensor 212 that measures the temperature of the cryogenic fuel in the primary flowline 228 and feeds the measured temperature back to a sub-cooler controller 232 to determine the actuator position in the first valve 206.

The example sub-cooler 204 illustrated in FIG. 2A includes the first valve 206 which can be an electronically-actuated proportional valve and/or servo valve, for example. Traditional directional control valves generally operate in fully open, fully closed, or fully switched states of flow. Changing flow direction during operation with traditional directional control valves would require separate individual valves for each direction and would involve complex hydraulic circuits. Proportional valves and/or servo valves can adjust the spool positions within the valves to control the flowrates through one or more outlets. The variable positioning allows spools to be designed with metering notches to provide directional control functions in a single valve. The example first valve 206 can be a proportional valve that inputs one flowline of cryogenic fuel and outputs two flowlines of variable and controllable volumetric flow, for example. The example first valve 206 can adjust the area of an inlet to the primary flowline 228 and the area of an inlet to the auxiliary flowline 230 by adjusting the spool position within the example first valve 206. By adjusting the inlet areas of the primary flowline 228 and the auxiliary flowline 230, the example first valve 206 adjusts the flowrate within the primary flowline 228 and the auxiliary flowline 230.

The example sub-cooler 204 illustrated in FIG. 2A includes the second valve 208, such as a thermal expansion valve, etc. A thermal expansion valve is a metering device that can input a cryogenic fluid and, in some examples, change the state of part of the cryogenic liquid to a gas, thus reducing the saturated pressure (e.g., from 40 psi to 4 psi) and temperature (e.g., from 24 K to 16 K) within the auxiliary flowline 230. When the saturated pressure of LH2 is decreased, the temperature of LH2 also decreases. Therefore, by thermally expanding the example LH2 in the second valve 208, the temperature in the auxiliary flowline 230 decreases. The relationship of temperature versus saturated pressure for example LH2 is described in greater detail below in connection with FIG. 3. The example second valve 208 can maintain a consistent saturated pressure in the auxiliary flowline downstream of the second valve 208 by mechanically and/or electronically adjusting the flow of fluid from the upstream inlet to the downstream outlet during operation. The saturated pressure the example second valve 208 outputs can be calibrated prior to operation.

The example sub-cooler 204 illustrated in FIG. 2A includes the cryogenic heat exchanger 210. The example cryogenic heat exchanger 210 can transfer heat from a warmer flowline (e.g., the primary flowline 228) to a cooler flowline (e.g., the auxiliary flowline 230). The primary flowline 228 and the auxiliary flowline 230 enter the cryogenic heat exchanger 210 and flow through sets of tubes and/or plates within a casing and/or a shell. The tubes can be supported by other components, for example fans, condensers, coolants, plates, baffles, tie-rods, spacers, etc. The primary flowline 228 indirectly contacts the auxiliary flowline 230 such that the fluids do not mix, but the primary flowline 228 can freely transfer heat to the auxiliary flowline 230. The example cryogenic heat exchanger 210 can be of single pass and/or multi pass designs with fluid flowing in a cross flow, counter flow, or parallel flow pattern. In some examples, the cryogenic heat exchanger 210 uses a cross flow method wherein the primary flowline 228 and the auxiliary flowline 230 enter the cryogenic heat exchanger 210 at two different points and cross paths perpendicularly. In some examples, the cryogenic heat exchanger 210 uses a parallel flow method wherein the primary flowline 228 and the auxiliary flowline 230 enter the cryogenic heat exchanger 210 at the same end, flow in parallel paths, and exit at the other end. In some examples, the cryogenic heat exchanger 210 uses a counter flow method wherein the primary flowline 228 and the auxiliary flowline 230 enter the cryogenic heat exchanger 210 at opposite ends, flow in parallel paths, and exit at opposite ends. The example sub-cooler 204 illustrated in FIG. 2A includes a temperature sensor 212. The example temperature sensor 212 can measure the temperature of the cryogenic fuel within the primary flowline 228 and feed back the measured temperature to the sub-cooler controller 232. The example temperature sensor 212 can be a cryogenic silicon sensor, platinum resistance sensor, cryogenic temperature monitor, etc.

The example sub-cooler 204 illustrated in FIG. 2A includes a sub-cooler controller 232. The example sub-cooler controller 232 is a closed-loop control system including a first controller and a second controller. In some examples, the first controller is a temperature loop controller 234. In some examples, the second controller is a position loop controller 236. The temperature loop controller 234 and/or the position loop controller 236 of FIG. 2A may be instantiated (e.g., creating an instance of, bring into being for any length of time, materialize, implement, etc.) by processor circuitry 238 such as a central processing unit executing instructions. In some examples, the temperature loop controller 234 and the position loop controller 236 are integrated on the processor circuitry 238 as shown in FIG. 2A. The example temperature loop controller 234 determines a commanded first valve actuator position based on at least a source temperature and a target temperature. In some examples, the source temperature is a temperature of the cryogenic fuel in the supply tank 202. In some examples, the target temperature is a temperature of the cryogenic fuel stored in the onboard cryogenic fuel tank 214. The temperature in the example supply tank 202 can be read manually from a temperature gauge and entered into the temperature loop controller 234, read and entered electronically by the temperature loop controller 234, or any combination of those options. The example temperature loop controller 234 determines an error between a measured temperature from the temperature sensor 212 and the target temperature. The example temperature loop controller 234 determines (e.g., adjusts) the commanded first valve actuator position based on the error and a preceding commanded first valve actuator position.

The example position loop controller 236 determines an actual first valve actuator position based on the commanded first valve actuator position. The example position loop controller 236 generates a primary first valve effective area and an auxiliary first valve effective area based on the actual first valve actuator position. In some examples, the primary first valve effective area is at the inlet of the primary flowline 228. In some examples, the auxiliary first valve effective area is at the inlet of the auxiliary flowline 230. By increasing the primary first valve effective area in conjunction with decreasing the auxiliary first valve effective area, the temperature of the cryogenic fuel in the primary flowline 228 (measured by the temperature sensor 212) increases. By decreasing the primary first valve effective area in conjunction with increasing the auxiliary first valve effective area, the temperature of the cryogenic fuel in the primary flowline 228 (measured by the temperature sensor 212) decreases.

The example cryogenic heat exchanger 210 of the sub-cooler 204 illustrated in FIG. 2A can input cryogenic fuel in the primary flowline 228 at one temperature (e.g., 24 K) and can output the cryogenic fuel in the primary flowline 228 at a lower temperature (e.g., 20 K). The temperature output in the primary flowline 228 from the example cryogenic heat exchanger 210 is dependent on the amount of cryogenic liquid and/or vapor that is input to the cryogenic heat exchanger 210 via the auxiliary flowline 230. In some examples, the amount of cryogenic liquid and/or vapor input to the cryogenic heat exchanger 210 via the auxiliary flowline 230 is determined based on the primary first valve effective area and the auxiliary first valve effective area generated by the position loop controller 236. Two examples disclosed below illustrate operational cases of the sub-cooler 204, wherein the example LH2 temperature in the supply tank 202 is 24 K, the LH2 temperature in the auxiliary flowline 230 downstream of the second valve 208 is 16 K, and the target temperature in the onboard cryogenic fuel tank 112 is 20 K. In a first example, the first valve 206 is actuated by the sub-cooler controller 232 such that the primary first valve effective area is 90% of the maximum area of the inlet to the primary flowline 228 and the auxiliary first valve effective area is 10% of the maximum area of the inlet to the auxiliary flowline 230. The first example case can result in the LH2 temperature measured by the temperature sensor 212 to be 22 K. In a second example, the sub-cooler controller 232 actuates the first valve 206 such that the primary first valve effective area is 80% of the maximum area of the inlet to the primary flowline 228 and the auxiliary first valve effective area is 20% of the maximum area of the inlet to the auxiliary flowline 230. The second example case can result in the LH2 temperature measured by the temperature sensor 212 to be 20 K, which matches the target temperature.

As shown in FIG. 2A, the example onboard cryogenic fuel tank 214 is located on a hydrogen aircraft to supply liquid or gaseous hydrogen to modified gas-turbine engine(s). The example hydrogen-powered turbine engine(s) combust a mixture of hydrogen fuel and compressed air to generate thrust. The example onboard cryogenic fuel tank 214 used to store cryogenic fuel (e.g., LH2) has thicker walls and made of stronger alloys than non-cryogenic fuel tanks to avoid brittle cracking. The example onboard cryogenic fuel tank 214 also has a venting device, such as a vent valve, to release vapor pressure build up. The term "vapor pressure" is used herein to describe the pressure exerted on a container (e.g., supply tank 202 and/or onboard cryogenic fuel tank 214) and the cryogenic liquid by the evaporated or vaporized cryogenic liquid. The example onboard cryogenic fuel tank 214 stores cryogenic fuel at low temperatures (e.g., 20 K) relative to non-cryogenic fuel tanks. The example onboard cryogenic fuel tank 214 thermally insulates the cryogenic fuel to prevent temperature increases (e.g., from 20 K to 24 K) which can cause boil-off and saturated pressure increases (e.g., from 14 psi to 40 psi). The onboard cryogenic fuel tank 214 of this example can have a smaller volume than the onboard cryogenic fuel tank 112 illustrated in FIG. 1 due to the increased density of the sub-cooled cryogenic fuel. For example, the sub-cooler 204 can reduce the temperature of example LH2 from 24 K to 20 K, thus increasing the density of the flowing LH2 from 66 kg/m$^3$ to 71 kg/m$^3$. In some examples, the system 100 illustrated in FIG. 1 does not include the sub-cooler 204 and thus refuels the example onboard cryogenic fuel tank 112 with LH2 at 24 K and 66 kg/m$^3$. In some examples, the onboard cryogenic fuel tank 112 of the example system 100 can be 20 m$^3$ in volume. Since volume is inversely proportional to density, if the example system 200 refuels LH2 at a density of 71 kg/m$^3$, then the volume of the onboard cryogenic fuel tank 214 can be 18.6 m$^3$ to contain the same mass of LH2 fuel as the onboard cryogenic fuel tank 112 of system 100.

The example sub-cooling cryogenic refueling system 200 illustrated in FIG. 2A includes a supply tank 202. In some examples, the supply tank 202 is a cryogenic transport trailer and/or mobile tanker that brings cryogenic fuel to the refueling location. For example, the supply tank 202 can be driven on a tarmac to refuel a hydrogen aircraft preflight. In some examples, the supply tank 202 contains an integrated and/or separate system and/or apparatus for equalizing vapor pressure within the supply tank 202 and providing a pressure differential between the supply tank 202 and the onboard cryogenic fuel tank 214. The term source temperature refers to the temperature of the cryogenic fuel stored in the example supply tank 202 prior to refueling of the example onboard cryogenic fuel tank 214. Further examples of systems and/or apparatus for providing a pressure differential to the system 200 are described below.

The example sub-cooling cryogenic refueling system 200 illustrated in FIG. 2A includes a vaporizer 222. The example vaporizer 222 can be a cryogenic vaporizer that converts liquid cryogens into a gaseous state. The example vaporizer 222 can use fins to absorb heat from surrounding ambient air and transfer that heat to the cryogenic fuel flowing though the tube. The example cryogenic fuel can be partially or fully converted to a gaseous state by the second valve 208 and/or the cryogenic heat exchanger 210. The example vaporizer 222 ensures that the unused cryogenic fuel in the auxiliary flowline 230 is converted to a gas for storage and reuse. The pressure setting of the example vaporizer 222 refers to the pressure of vaporized cryogenic liquid exiting the example vaporizer 222. The pressure setting can be adjusted by the sub-cooler controller 232 or by another controller located on and/or connected to the example vaporizer 222. Alternatively, the cryogenic fuel can be vaporized and released into ambient air.

The example vaporizer 222 illustrated in FIG. 2A leads to a compressor 224 and a storage tank 226. The example compressor 224 pressurizes the gas leaving the vaporizer 222 and directs the pressurized gas into the storage tank 226. The pressure of the gas exiting the example compressor 224 divided by the pressure of the gas entering the example compressor 224 is referred to as the compression ratio of the compressor 224. The example compression ratio can be adjusted by the sub-cooler controller 232 or another controller and/or control system located on and/or connected to the compressor 224. The unused gas in the storage tank 226 can be converted back into a cryogenic fluid and used at a later time as a cryogenic fuel.

Figure 2B:
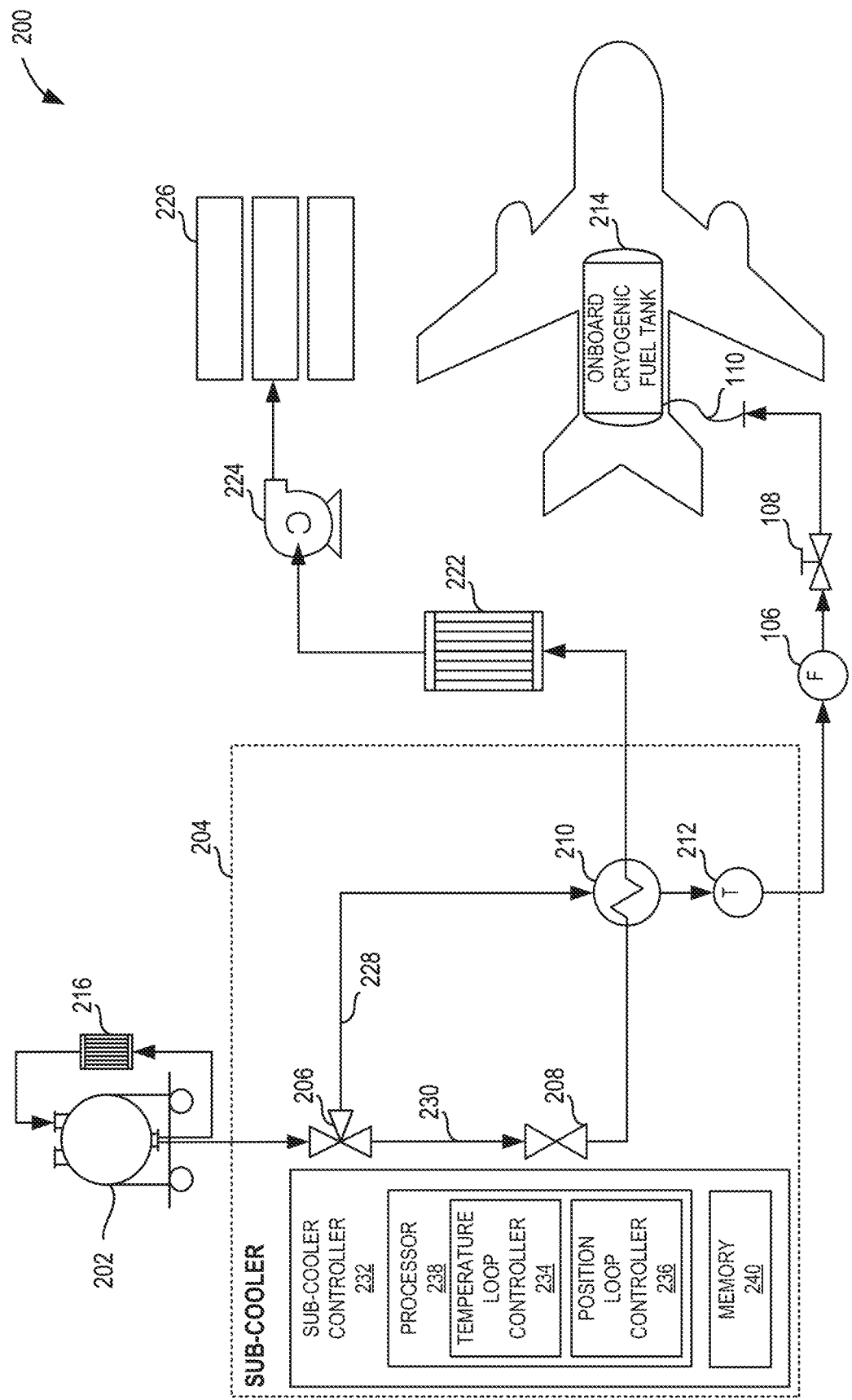
FIG. 2B illustrates a second example sub-cooling system for refueling an onboard cryogenic fuel tank in accordance with the teaching of this disclosure.

FIG. 2B illustrates a sub-cooling cryogenic refueling system 200 ("system 200") that includes a sub-cooler 204 as previously described. The example sub-cooler 204 can be used in conjunction with the cryogenic refueling system 100 of FIG. 1, in place of the flow control valve 104, and with additional components such as a pressure building coil 216, a vaporizer 222, a compressor 224, and a storage tank 226. In the illustrated example of FIG. 2B, the sub-cooler 204 includes a first valve 206, a second valve 208, a cryogenic heat exchanger 210, and a temperature sensor 212 as previously described in reference to FIG. 2A. In the illustrated example of FIG. 2B, the system 200 includes a flowmeter 106, a cryogenic valve 108, VJ flowlines 110, the onboard cryogenic fuel tank 214, the vaporizer 222, the compressor 224, and the storage tank 226. The example system 200 as illustrated in FIG. 2B also includes a supply tank 202 with the example pressure building coil 216 connected to the supply tank 202.

The example supply tank 202 of FIG. 2B includes a flowline leading to a pressure building coil 216. In some examples, the flowline leading to the pressure building coil 216 is separate from the flowline leading to the sub-cooler 204. The example pressure building coil 216 includes a flowline leading back to the supply tank 202. In some examples, the cryogenic fuel in the supply tank 202 is extracted through the flowline into the pressure building coil 216 in accordance with the flow direction illustrated in FIG. 2B. In some examples, the pressure building coil 216 increases the vapor pressure in the supply tank 202 prior to refueling such that the vapor pressure in the supply tank is greater than the vapor pressure in the onboard cryogenic fuel tank 214. The example onboard cryogenic fuel tank 214 includes a vent valve that is opened to reduce the vapor pressure within the onboard cryogenic fuel tank 214. In some examples, increasing the vapor pressure in the supply tank 202 and reducing the vapor pressure in the onboard cryogenic fuel tank 214 provides a pressure differential to the system 200.

The example pressure building coil 216 of FIG. 2B is used to regulate and maintain vapor pressure for consistent refueling speed in the system 200. In some examples the pressure building coil 216 is a vaporizer with fins heated by ambient air, which cause flowing cryogenic liquid to phase change into vapor. The pressure building coil 216 of this example feeds the vapor back into the supply tank 202, thus increasing the vapor pressure within the supply tank 202. In some examples, the rising vapor pressure applies a distributed force to the surface of the cryogenic fuel, which drives the cryogenic fuel to flow through the pressure building coil 216, and thus forms a pressure building loop. The example pressure building coil 216 includes a controller that actuates the input valve to the pressure building loop in response to the output vapor pressure of the pressure building coil 216. For example, prior to refueling, the onboard cryogenic fuel tank 214 has a vapor pressure of 100 psi and the supply tank 202 has a vapor pressure of 15 psi. The example valve to the pressure building coil 216 is opened and the output pressure is set to 100 psi with the controller. At the same time, for instance, the vent valve on the onboard cryogenic fuel tank 214 is opened and the vapor pressure is reduced to 70 psi. In such examples, the refueling speed of the system 200 will be a first speed. If, for example, the vapor pressure was increased to 80 psi in the supply tank 202 by the pressure building coil 216, and the vapor pressure was reduced to 70 psi in the onboard cryogenic fuel tank 214, then the refueling speed would be less than the first speed.

Figure 2C:
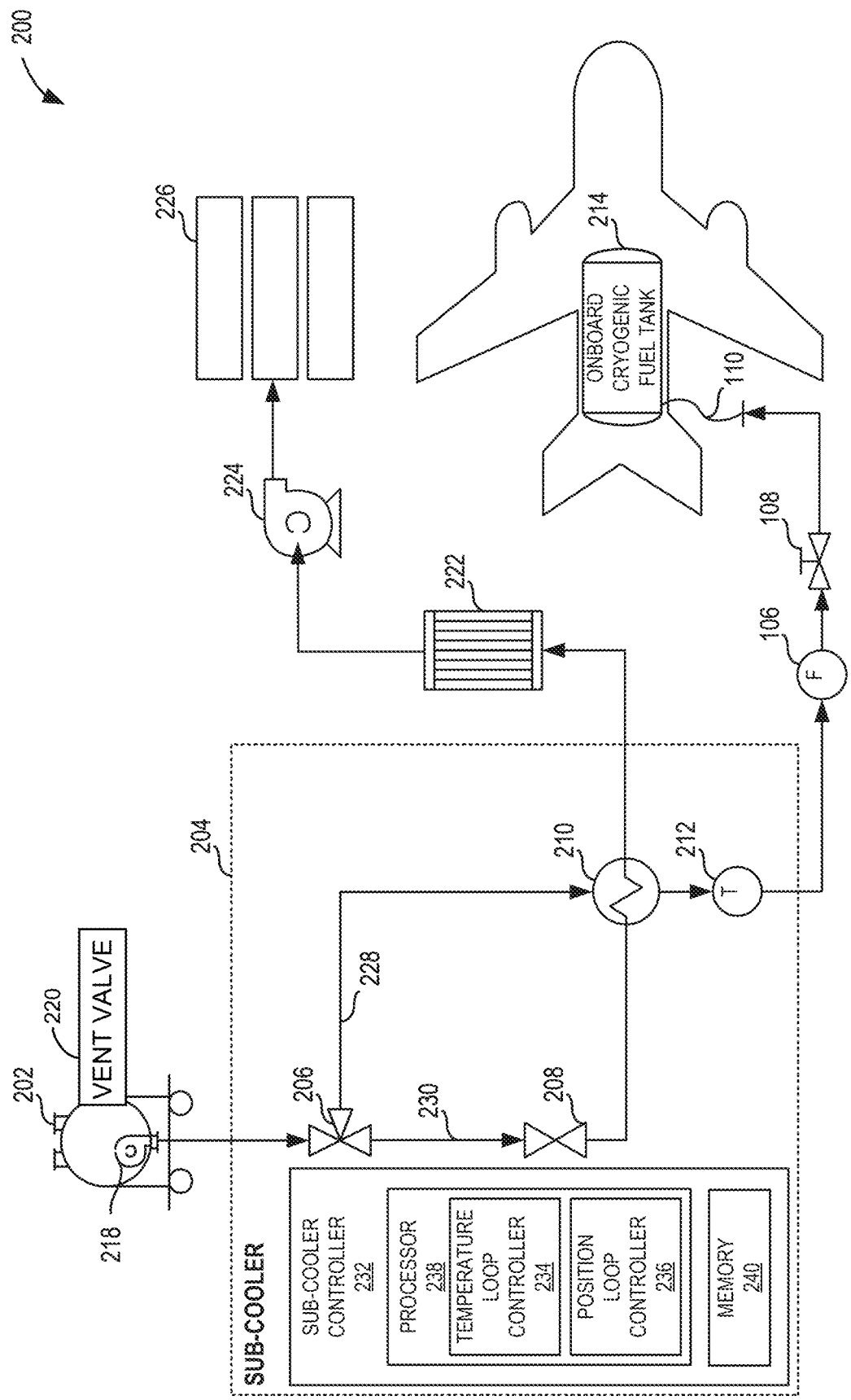
FIG. 2C illustrates a third example sub-cooling system for refueling an onboard cryogenic fuel tank in accordance with the teaching of this disclosure.

FIG. 2C illustrates a sub-cooling cryogenic refueling system 200 ("system 200") that includes a sub-cooler 204 as previously described. The example sub-cooler 204 can be used in conjunction with the cryogenic refueling system 100 of FIG. 1, in place of the flow control valve 104, and with additional components such as a transfer pump 218, a vaporizer 222, a compressor 224, and a storage tank 226. In the illustrated example of FIG. 2C, the sub-cooler 204 includes a first valve 206, a second valve 208, a cryogenic heat exchanger 210, and a temperature sensor 212 as previously described in reference to FIG. 2A. In the illustrated example of FIG. 2C, the system 200 includes a flowmeter 106, a cryogenic valve 108, VJ flowlines 110, the onboard cryogenic fuel tank 214, the vaporizer 222, the compressor 224, and the storage tank 226. The example system 200 as illustrated in FIG. 2C also includes a supply tank 202 with the example transfer pump 218 submerged within and/or externally connected to the supply tank 202.

The example transfer pump 218 of FIG. 2C can be a cryogenic centrifugal pump that is electronically and/or hydraulically driven. In some examples, the transfer pump is submerged in the cryogenic liquid with the supply tank 202 and/or externally connected to the supply tank 202. In some examples, the transfer pump 218 is electronically actuated, controllable, and provides variable flow speeds of cryogenic fuel from the supply tank 202 to the system 200. In some examples, the transfer pump 218 includes a gearbox that provides fixed and/or variable flow speeds of cryogenic fuel from the supply tank 202 to the system 200. The example transfer pump 218 illustrated in FIG. 2C provides a vapor pressure to the system 200 that is greater than the vapor pressure within the onboard cryogenic fuel tank 214. In some examples, the vent valves 220 on the onboard cryogenic fuel tank 214 can be opened to reduce the pressure within the onboard cryogenic fuel tank 214 to adjust the flowrate within the system 200 and/or to alleviate the work required by the transfer pump 218 to pump the cryogenic fuel into the system 200.

Figure 3:
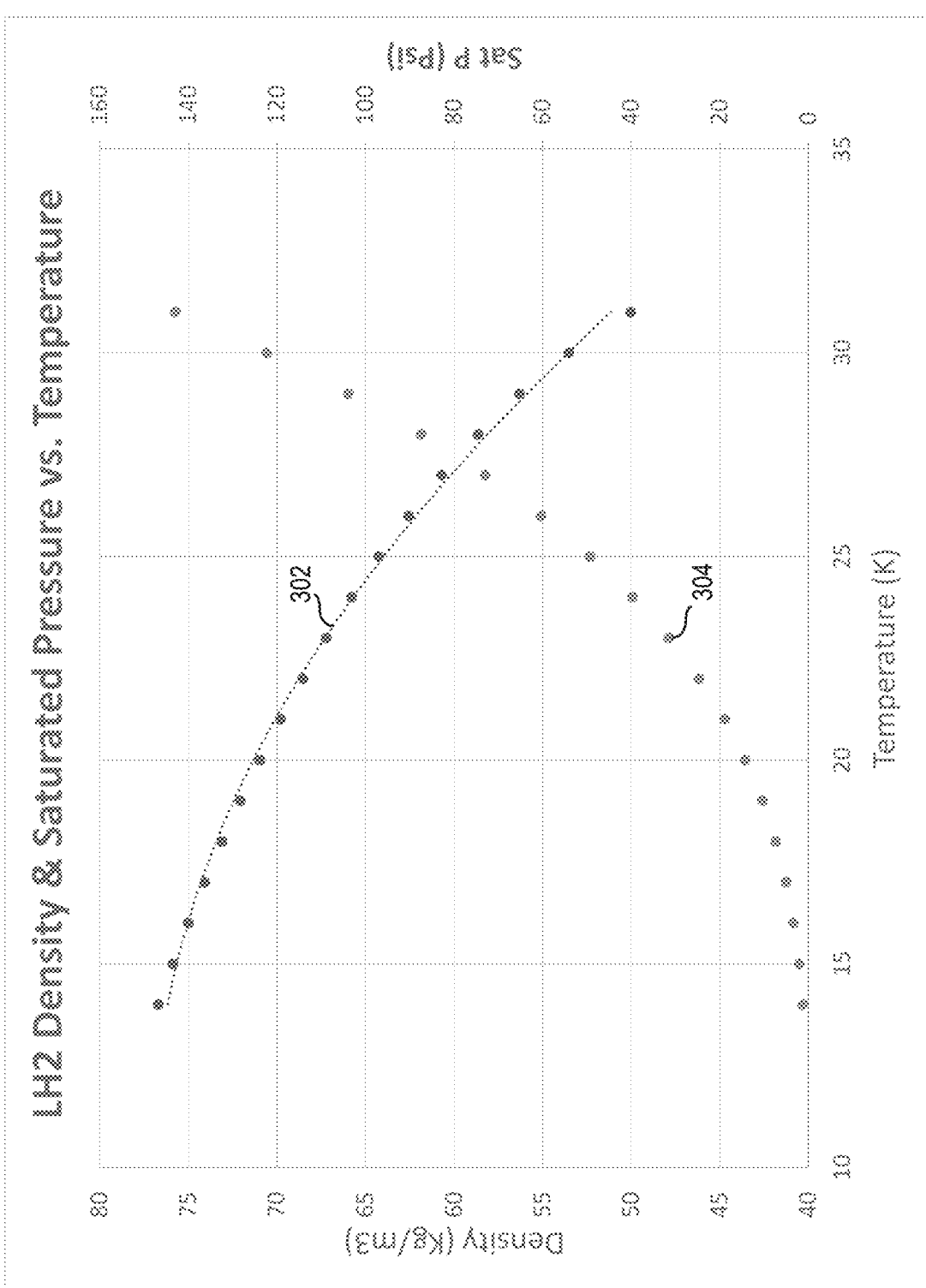
FIG. 3 illustrates thermodynamic properties of saturated pressure versus temperature and density versus temperature of liquid hydrogen, an example cryogenic fuel.

FIG. 3 is a chart illustrating a thermodynamic relationship of temperature versus density 302 and temperature versus saturated pressure 304 for liquid hydrogen, an example of cryogenic fuel. The thermodynamic properties of LH2 shown in FIG. 3 can be used to determine the mass of LH2 refueled to the onboard cryogenic fuel tank 214 and a target temperature and saturated pressure of LH2 refueled to the onboard cryogenic fuel tank 214 of FIGS. 2A-2C. For example, the temperature of LH2 measured by the temperature sensor 212 can be input to the density-temperature function 302 plotted in FIG. 3 by the sub-cooler controller 232 or another computing system to return the density of the example LH2. In such an example, the volumetric flowrate measured by the flowmeter 106 and the density determined by the density-temperature function 302 can be used to determine the mass of LH2 supplied to the onboard cryogenic fuel tank 214.

Figure 4:
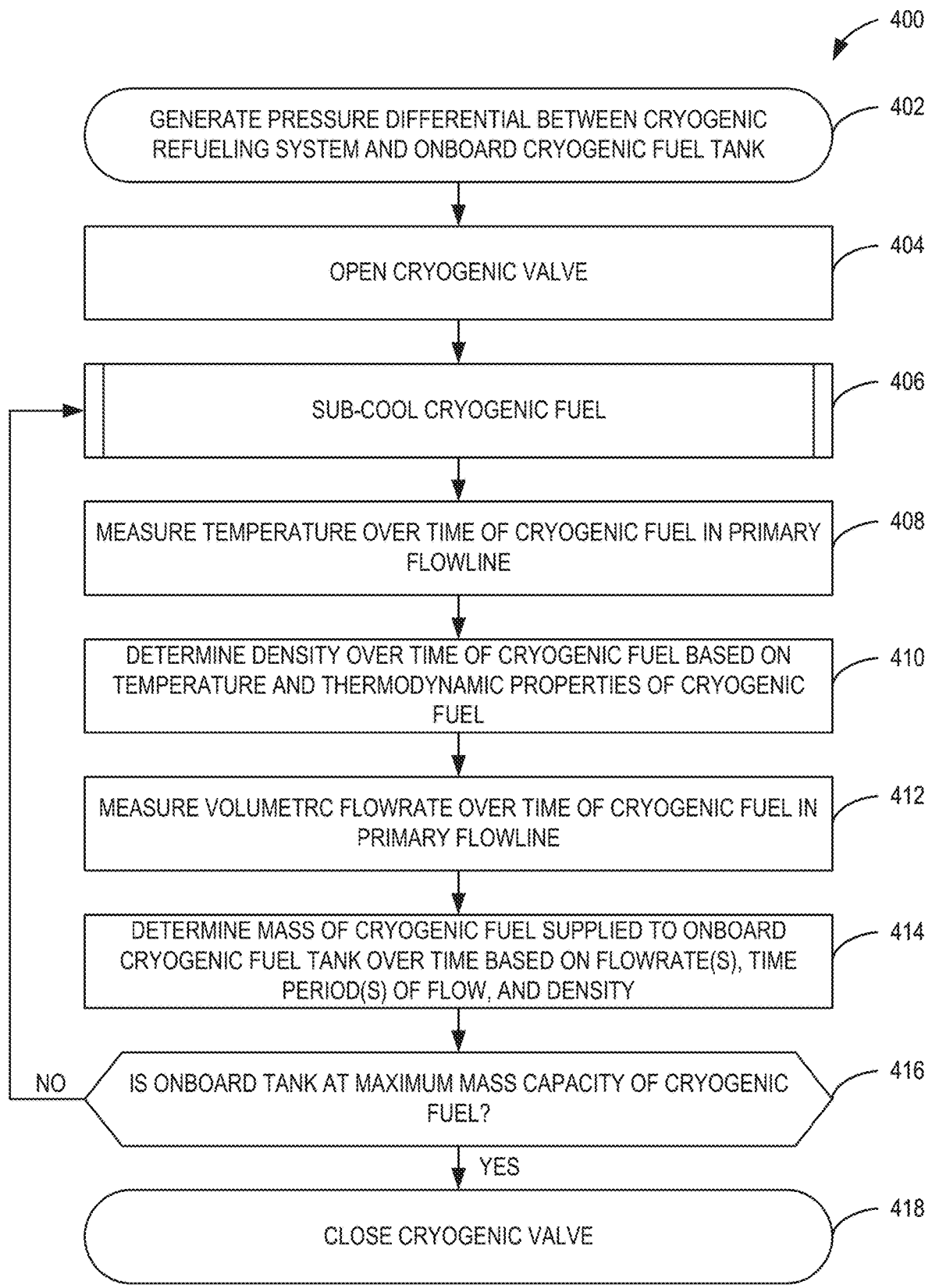
FIG. 4 is a flow diagram illustrating an operation of the sub-cooling system.

FIG. 4 is a flow diagram illustrating an example process/operation 400 to control operation of the sub-cooling cryogenic refueling system 200 as disclosed herein. While the example process/operation 400 is described with primary reference to sub-cooling LH2 with the sub-cooling cryogenic refueling system 200 of FIGS. 2A-2C, the process/operation 400 can be used to refuel an onboard cryogenic fuel tank with another sub-cooled cryogenic fuel.

At block 402, the supply tank 202 increases vapor pressure within the supply tank 202 and/or increases the vapor pressure within the system 200. The supply tank 202 has a pressure building coil 216 as illustrated in FIG. 2B, a transfer pump 218 as illustrated in FIG. 2C, and/or another pressure building system as illustrated in FIG. 2A incorporated with the supply tank 202 and/or with the system 200 upstream of the sub-cooler 204. In conjunction with increasing the vapor pressure in the supply tank 202 and/or in the system 200, the vapor pressure in the onboard cryogenic fuel tank 214 is decreased by opening vent valves on the onboard cryogenic fuel tank 214. This combination of pressure changes generates a pressure differential across the system 200.

At block 404, the cryogenic valve 108 is opened either manually or electronically by the sub-cooler controller 232 or another controller integrated into the system 200. Opening the cryogenic valve 108 begins the refueling of the onboard cryogenic fuel tank 214, allowing the cryogenic fuel to pass through the sub-cooler 204 into the onboard cryogenic fuel tank 214.

At block 406, the cryogenic fuel is sub-cooled by the sub-cooler 204. For example, the cryogenic fuel from the supply tank 202 flows to a first valve 206 that splits the flow into a primary flowline 228 and an auxiliary flowline 230. The auxiliary flowline 230 directs the cryogenic fuel to a second valve 208 that lowers the saturated pressure and temperature of the cryogenic fuel. Both the primary flowline 228 and the auxiliary flowline 230 flow to a cryogenic heat exchanger 210, where heat is transferred from the primary flowline 228 to the auxiliary flowline 230. The sub-cooled cryogenic fuel in the primary flowline 228 is then directed to a temperature sensor 212 and ultimately to an onboard cryogenic fuel tank 214.

At block 408, the temperature of the cryogenic fuel is measured by the temperature sensor 212 and stored at multiple intervals over the duration of the refueling operation. The measured temperatures can be stored in the sub-cooler controller memory 240 and/or in some other memory located in the system 200.

At block 410, the density of the cryogenic fuel is determined and stored at the same intervals over the duration of the refueling operation based on example thermodynamic properties as illustrated in FIG. 3. The determined densities can be stored in the sub-cooler controller memory 240 and/or in another memory located in the system 200, for example.

At block 412, the volumetric flowrate is measured by the flowmeter 106 and stored at the same intervals over the duration of the refueling operation. The measured flowrates can be stored in the sub-cooler controller memory 240 and/or in another memory located in the system 200.

At block 414, the sub-cooler controller 232 and/or another computing device located in the system 200 can determine the total mass of cryogenic fuel stored in the onboard cryogenic fuel tank 214 based on the temperatures, densities, and flowrates measured and/or determined over the duration of the refueling operation. For example, the sub-cooler 204 can refuel LH2 to the onboard cryogenic fuel tank 214 at 20 K, which corresponds to an LH2 density of 71 kg/m$^3$. In such an example, the onboard cryogenic fuel tank 214 can have a maximum volume capacity for LH2 of 18 m$^3$. If the flowmeter measures the volumetric flowrate to be 0.01 m$^3$/s, while the example LH2 is 20 K, then the time it takes to refuel the onboard cryogenic fuel tank 214 is 30 minutes and the total mass of refueled LH2 is 1278 kg.

At block 416, the sub-cooler controller 232 or another controlling device located in the system 200 can determine if the total mass of cryogenic fuel stored in the onboard cryogenic fuel tank 214 is at the target total mass (e.g., 1278 kg). If the total mass of the cryogenic fuel in the onboard cryogenic fuel tank 214 is not at the target capacity, then the sub-cooling cryogenic refueling operation continues as control reverts to block 406.

At block 418, if the total mass of the cryogenic fuel in the onboard cryogenic fuel tank 214 is at the target capacity, then the sub-cooler controller 232 or another controlling device located in the system 200 can send an electronic signal to the cryogenic valve 108 to shut off the flow and end the refueling operation. Alternatively, if the total mass of the cryogenic fuel in the onboard cryogenic fuel tank 214 is at the target capacity, then the cryogenic valve can be shut off manually.

Figure 5:
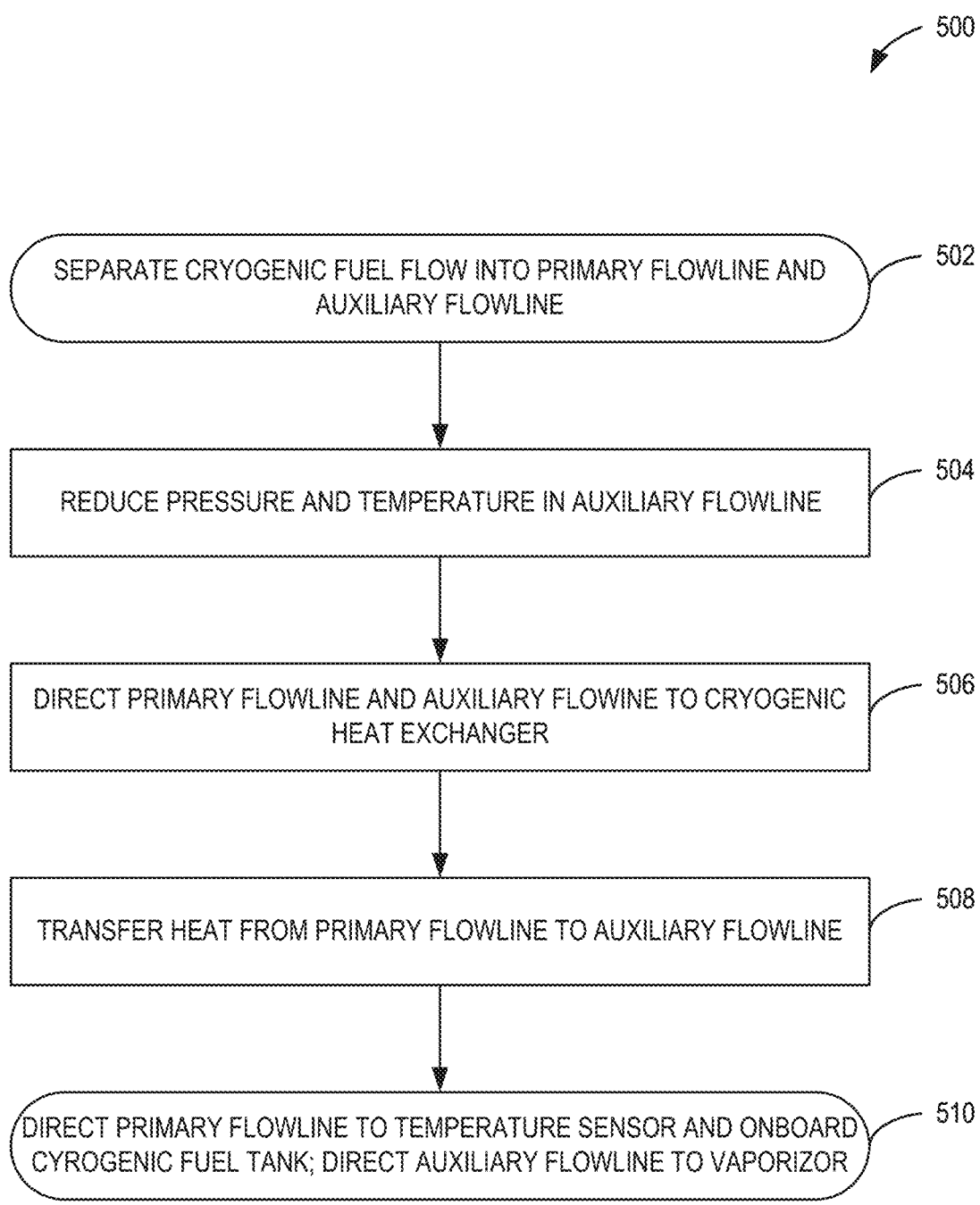
FIG. 5 is a flow diagram illustrating an operation of a sub-cooler in the sub-cooling system.

FIG. 5 is a flow diagram illustrating an example process or operation 500 according to block 406 of FIG. 4 to sub-cool the cryogenic fuel by the sub-cooler 204 (e.g., block 406 of the example of FIG. 4) that may be followed by the sub-cooler 204 as disclosed herein. While the operation 500 is described with primary reference to sub-cooling LH2 with the sub-cooler 204 of FIGS. 2A-2C, the operation 500 can be used to refuel an onboard cryogenic fuel tank with another sub-cooled cryogenic fuel.

At block 502, the first valve 206 of the sub-cooler 204 separates the flow of cryogenic fuel from the supply tank 202 into a primary flowline 228 and an auxiliary flowline 230. For example, the controller can actuate the first valve 206 such that the primary first valve effective area is 90% of the maximum area of the inlet to the primary flowline 228 and the auxiliary first valve effective area is 10% of the maximum area of the inlet to the auxiliary flowline 230. Therefore, 90% of the cryogenic fuel from the supply tank 202 flows into the primary flowline 228 and 10% of the cryogenic fuel from the supply tank 202 flows into the auxiliary flowline 230.

At block 504, the second valve 208 of the sub-cooler 204 reduces the saturated pressure of the cryogenic fuel in the auxiliary flowline 230, thereby reducing the temperature of the cryogenic fuel in the auxiliary flowline 230. For example, the second valve 208 can expand LH2 in the auxiliary flowline 230 such that the LH2 temperature drops from 24 K to 16 K and the LH2 saturated pressure drops from 40 psi to 14 psi.

At block 506, the sub-cooler 204 directs the primary flowline 228 and the auxiliary flowline 230 to the cryogenic heat exchanger 210. At block 508, the cryogenic heat exchanger 210 processes the cryogenic fuel from the primary flowline 228 and the auxiliary flowline 230 to transfer heat from the primary flowline 228 to the auxiliary flowline 230, which sub-cools the cryogenic fuel flowing through the primary flowline 228. For example, the cryogenic fuel temperature entering the cryogenic heat exchanger 210 via the primary flowline 228 can be 24 K and the cryogenic fuel temperature entering the cryogenic heat exchanger 210 via the auxiliary flowline 230 can be 16 K. In such an example, the cryogenic fuel temperature exiting the cryogenic heat exchanger 210 via the primary flowline 228 can be 20 K, depending on how much cryogenic fuel was diverted to the auxiliary flowline 230 by the first valve 206.

At block 510, the sub-cooler 204 directs the primary flowline 228 to the temperature sensor 212 and then, to the onboard cryogenic fuel tank 214. The sub-cooler 204 also directs the auxiliary flowline to the vaporizer 222.

Figure 6:
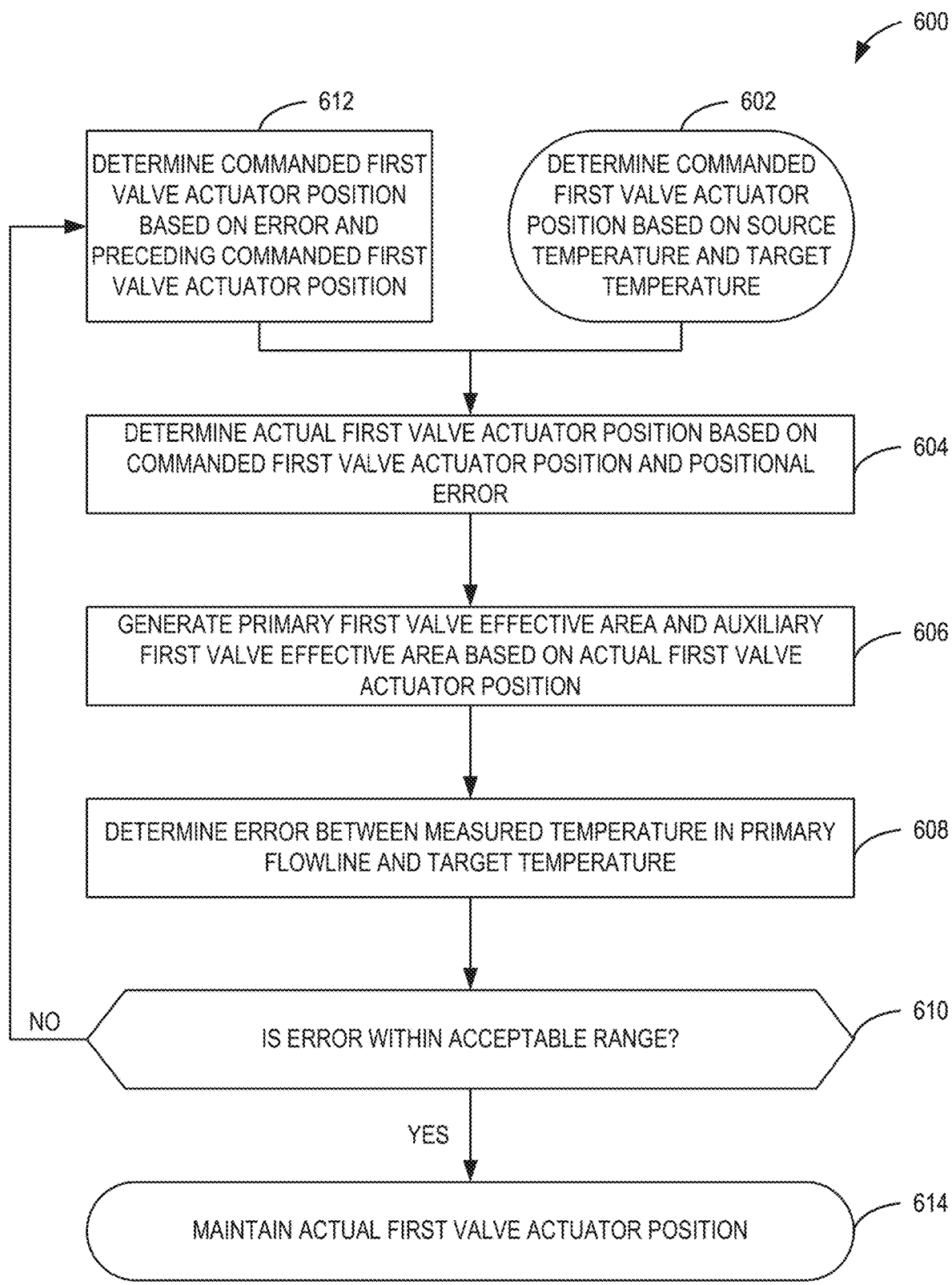
FIG. 6 is a flow diagram illustrating example machine readable instructions and/or operations that may be executed and/or instantiated by example processor circuitry to implement a sub-cooler controller that controls the sub-cooler in the sub-cooling system.

FIG. 6 is a flow diagram illustrating an operation 600 that may be followed by the sub-cooler controller 232 as disclosed herein. While the operation 600 is described with primary reference to the sub-cooler controller 232 of FIGS. 2A-2C, the operation 600 can be used to control any sub-cooler in a sub-cooling cryogenic refueling system.

At block 602, the temperature loop controller 234 determines a commanded first valve actuator position based on the temperature of the cryogenic fuel in the supply tank 202 and the target temperature of the cryogenic fuel to be stored in the onboard cryogenic fuel tank 214. For example, the cryogenic fuel temperature stored in the supply tank 202 can be 24 K and the target cryogenic fuel temperature to be stored in the onboard cryogenic fuel tank 214 can be 20 K. The example temperature loop controller 234 can determine that to achieve the target temperature, the first valve actuator position shall be actuated to a position in which the primary first valve effective area is 80% of the maximum area of the inlet to the primary flowline 228 and the auxiliary first valve effective area is 20% of the maximum area of the inlet to the auxiliary flowline 230.

At block 604, the position loop controller 236 determines an actual first valve actuator position based on the commanded first valve actuator position. The commanded first valve actuator position is the position to which the spool(s) inside the first valve 206 are to be actuated by a servomotor to achieve a desired primary and auxiliary first valve effective areas. The position loop controller 236 obtains the actual first valve actuator position from a servomotor sensor in the first valve 206. The position loop controller 236 determines the error/difference between the actual first valve actuator position from the servomotor sensor and the commanded first valve actuator position from the temperature loop controller 234. The position loop controller 236 uses a feedback loop to control the servomotor in the first valve 206 and reduce the error between the actual and commanded first valve actuator positions to near zero.

At block 606, the position loop controller 236 generates a primary first valve effective area and an auxiliary first valve effective area based on the actual first valve actuator position. The primary first valve effective area and the auxiliary first valve effective area affect the volumetric flowrates in the primary flowline 228 and the auxiliary flowline 230, respectively.

At block 608, the temperature loop controller 234 determines an error between the measured temperature from the temperature sensor 212 and the target temperature.

At block 610, the temperature loop controller 234 determines if the error is within an acceptable range and/or sufficiently near zero.

At block 612, if the temperature loop controller 234 determines that the error is not within the acceptable range, then the temperature loop controller 234 determines an adjusted commanded first valve actuator position based on the error and the preceding commanded first valve actuator position.

At block 614, if the temperature loop controller 234 determines that the error is within the acceptable range, then the position loop controller 236 maintains the current actual first valve actuator position.

Figure 7:
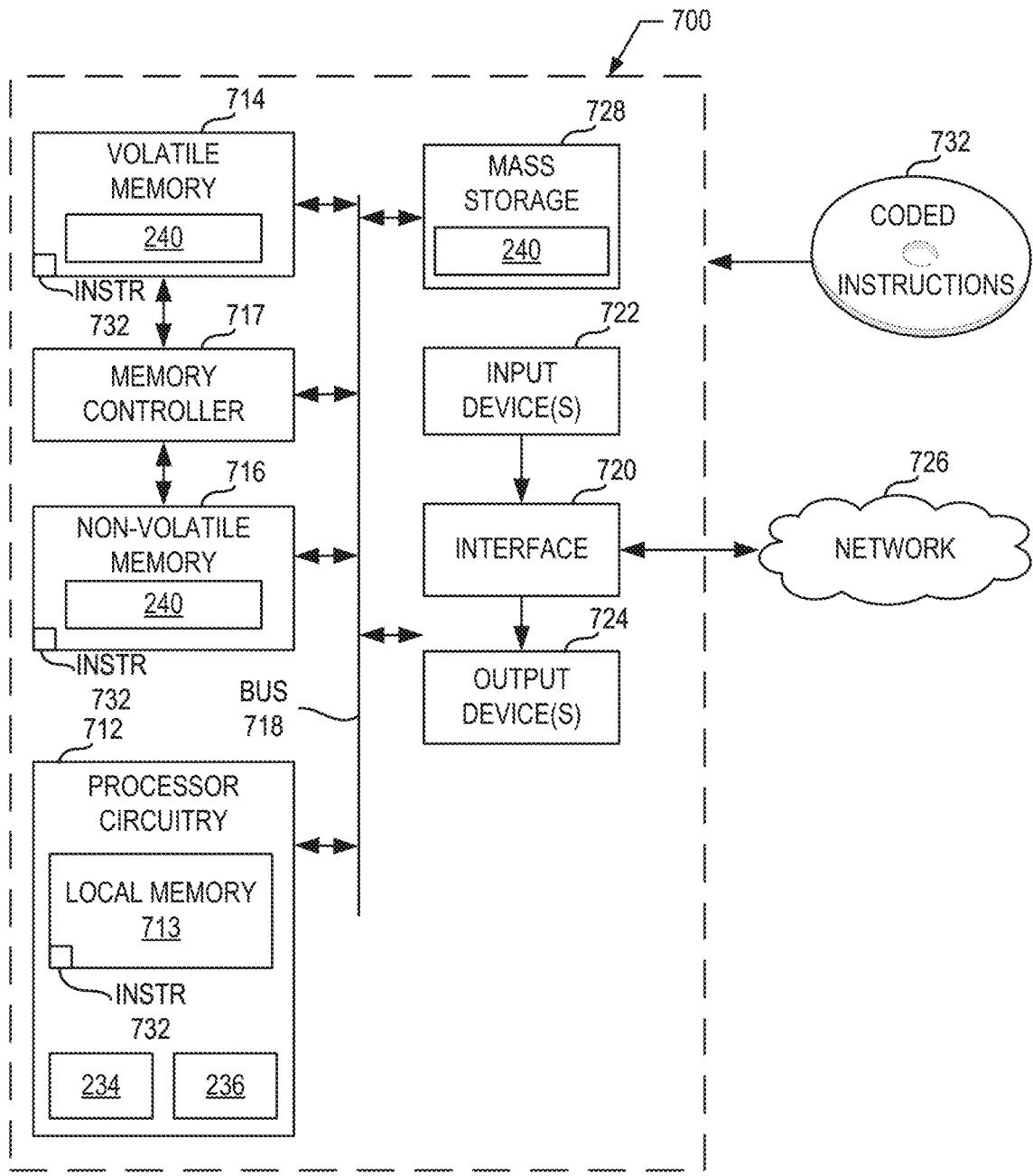
FIG. 7 illustrates an example processing platform including processor circuitry structured to execute the example machine readable instructions of FIG. 6.

FIG. 7 is a block diagram of an example processor platform 700 structured to execute and/or instantiate the machine readable instructions and/or operations of FIG. 6 to implement the sub-cooler controller 232 of FIGS. 2A-2C. The processor platform 700 can be, for example, a server, a personal computer, a workstation, a self-learning machine (e.g., a neural network), a mobile device (e.g., a cell phone, a smart phone, a tablet such as an iPad™), or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example temperature loop controller 234 and the example position loop controller 236.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or a tactile output device. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIG. 6, may be stored in the mass storage device 728, in the volatile memory 714, in the non-volatile memory 716, and/or on a removable non-transitory computer readable storage medium such as a CD or DVD.

A sub-cooler for a sub-cooling cryogenic refueling system is disclosed herein. The examples disclosed herein reduce the temperature and increase the density of cryogenic fuel supplied to onboard cryogenic fuel tank(s). The examples disclosed herein reduce the required volume of onboard tank(s) for liquid cryogen-fueled vehicles (e.g., hydrogen aircraft) and control the mass of the cryogenic fuel that is stored within the onboard tank.

Further aspects of the present disclosure are provided by the subject matter of the following clauses:

Example methods, apparatus, systems, and articles of manufacture to sub-cool cryogenic fuel during the refueling of onboard cryogenic fuel tanks are disclosed herein. Further examples and combinations thereof include the following:

Example 1 includes a sub-cooler comprising a first valve to separate a cryogenic fuel into a primary flowline and an auxiliary flowline, wherein the cryogenic fuel in the primary flowline has a first temperature, and wherein the cryogenic fuel in the auxiliary flowline has a second temperature, a second valve to reduce the second temperature of the cryogenic fuel in the auxiliary flowline by reducing a saturated pressure in the auxiliary flowline, a cryogenic heat exchanger to reduce the first temperature of the cryogenic fuel in the primary flowline by transferring heat from the primary flowline to the auxiliary flowline, a temperature sensor to measure a measured temperature of the cryogenic fuel in the primary flowline downstream of the cryogenic heat exchanger, and a sub-cooler controller including a temperature loop controller and a position loop controller configured to regulate the first temperature output.

Example 2 includes the sub-cooler of any preceding clause, wherein the first valve is a proportional valve.

Example 3 includes the sub-cooler of any preceding clause, wherein the second valve is an expansion valve.

Example 4 includes the sub-cooler of any preceding clause, wherein the primary flowline and the auxiliary flowline are vacuum jacketed flowlines.

Example 5 includes the sub-cooler of any preceding clause, wherein the primary flowline includes a flowmeter downstream of the cryogenic heat exchanger to measure a volumetric flowrate of the cryogenic fuel.

Example 6 includes the sub-cooler of any preceding clause, wherein the primary flowline includes a cryogenic valve downstream of the cryogenic heat exchanger to regulate flow of the cryogenic fuel to an onboard cryogenic fuel tank.

Example 7 includes the sub-cooler of any preceding clause, wherein the cryogenic heat exchanger includes a second flowline to direct the auxiliary flowline to a vaporizer, the vaporizer to convert the cryogenic fuel into a gas.

Example 8 includes the sub-cooler of any preceding clause, wherein the vaporizer includes a flowline to direct the gas to a compressor, the compressor to pressurize the gas in a storage tank.

Example 9 includes At least one non-transitory computer-readable medium comprising instructions that, when executed, cause a sub-cooler controller to at least separate a cryogenic fuel into a primary flowline and an auxiliary flowline by actuating a first valve, wherein the cryogenic fuel in the primary flowline has a first temperature, and wherein the cryogenic fuel in the auxiliary flowline has a second temperature, reduce the second temperature of the cryogenic fuel in the auxiliary flowline by reducing a saturated pressure in the auxiliary flowline using a second valve, reduce the first temperature of the cryogenic fuel in the primary flowline by transferring heat from the primary flowline to the auxiliary flowline using a cryogenic heat exchanger, measure a measured temperature of the cryogenic fuel in the primary flowline downstream of the cryogenic heat exchanger with a temperature sensor, and control a sub-cooler using a temperature loop controller and a position loop controller configured to regulate the first temperature output of the sub-cooler.

Example 10 includes the at least one non-transitory computer-readable medium of any preceding clause, wherein the instructions from the controller are to separate the cryogenic fuel into the primary flowline and the auxiliary flowline by actuating a proportional valve.

Example 11 includes the at least one non-transitory computer-readable medium of any preceding clause, wherein the instructions from the controller are to measure a volumetric flowrate of the cryogenic fuel with a flowmeter at the primary flowline downstream of the cryogenic heat exchanger.

Example 12 includes the at least one non-transitory computer-readable medium of any preceding clause, wherein the instructions from the controller are to regulate flow of the cryogenic fuel to an onboard cryogenic fuel tank using a cryogenic valve at the primary flowline downstream of the cryogenic heat exchanger.

Example 13 includes the at least one non-transitory computer-readable medium of any preceding clause, wherein the instructions from the controller adjust pressure settings of a vaporizer at the auxiliary flowline downstream of the cryogenic heat exchanger, the vaporizer to convert the cryogenic fuel into a gas.

Example 14 includes the at least one non-transitory computer-readable medium of any preceding clause, wherein the instructions from the controller adjust a compression ratio of a compressor at the auxiliary flowline downstream of the vaporizer, the compressor to pressurize the gas in a storage tank.

Example 15 includes a method to refuel an onboard cryogenic fuel tank, the method comprising controlling a sub-cooler of a cryogenic refueling system including determining, using a first controller, a commanded first valve actuator position based on at least a source temperature and a target temperature, determining, using the first controller, an error between a measured temperature from a temperature sensor and the target temperature, determining, using the first controller, the commanded first valve actuator position based on the error and a preceding commanded first valve actuator position, determining, using a second controller, an actual first valve actuator position based on the commanded first valve actuator position, and generating, using the second controller, a primary first valve effective area and an auxiliary first valve effective area based on the actual first valve actuator position.

Example 16 includes the method of any preceding clause, including generating a pressure differential across the cryogenic refueling system, wherein a first pressure upstream of the sub-cooler is greater than a second pressure within the onboard cryogenic fuel tank.

Example 17 includes the method of any preceding clause, including regulating flow, via a cryogenic valve, of a cryogenic fuel in a primary flowline to the onboard cryogenic fuel tank.

Example 18 includes the method of any preceding clause, further including measuring one or more volumetric flowrates, via a flowmeter, of the cryogenic fuel in the primary flowline downstream of a cryogenic heat exchanger, measuring the measured temperature, via the temperature sensor, of the cryogenic fuel in the primary flowline downstream of the cryogenic heat exchanger, determining a volume of the cryogenic fuel supplied to the onboard cryogenic fuel tank based on the one or more volumetric flowrates and one or more time periods of the one or more volumetric flowrates, determining a density of the cryogenic fuel based on at least the measured temperature of the cryogenic fuel and thermodynamic properties of the cryogenic fuel, and determining a mass of the cryogenic fuel supplied to the onboard cryogenic fuel tank based on at least the volume of the cryogenic fuel supplied to the onboard cryogenic fuel tank and the density of the cryogenic fuel.

Example 19 includes the method of any preceding clause, including directing, via a cryogenic heat exchanger, an auxiliary flowline to a storage tank.

Example 20 includes the method of any preceding clause, further including directing, via the cryogenic heat exchanger, the auxiliary flowline to a vaporizer, vaporizing, via the vaporizer, a cryogenic fuel into a gas, and pressurizing, via a compressor, the gas in the storage tank.

The following claims are hereby incorporated into this Detailed Description by this reference, with each claim standing on its own as a separate embodiment of the present disclosure.

What is claimed is:

1. A system comprising:
   a first valve configured to separate a cryogenic fuel into a primary flowline and an auxiliary flowline, wherein the cryogenic fuel in the primary flowline has a first temperature, and wherein the cryogenic fuel in the auxiliary flowline has a second temperature;
   a second valve configured to reduce the second temperature of the cryogenic fuel in the auxiliary flowline by reducing a saturated pressure in the auxiliary flowline;
   a cryogenic heat exchanger to reduce the first temperature of the cryogenic fuel in the primary flowline by transferring heat from the primary flowline to the auxiliary flowline;
   a temperature sensor to measure a measured temperature of the cryogenic fuel in the primary flowline downstream of the cryogenic heat exchanger;
   a supply tank upstream of the first valve, the supply tank including a submerged transfer pump to increase a vapor pressure of the cryogenic fuel exiting the supply tank;
   a fuel tank downstream of the cryogenic heat exchanger, the fuel tank storing the cryogenic fuel at a higher density than the supply tank; and
   a controller to:
     control at least one of a first position of the first valve or a second position of the second valve including to regulate the first temperature;
     determine a density of the cryogenic fuel based on the first temperature; and
     determine a mass of the cryogenic fuel flowing from the cryogenic heat exchanger based on the density, a volumetric flow rate of the cryogenic fuel, and a duration of flow of the cryogenic fuel.

2. The system of claim 1, wherein the first valve is a proportional valve.

3. The system of claim 1, wherein the second valve is an expansion valve.

4. The system of claim 1, wherein the primary flowline and the auxiliary flowline are vacuum-jacketed flowlines, and wherein the primary flowline includes:

a flowmeter downstream of the cryogenic heat exchanger to measure a volumetric flowrate of the cryogenic fuel; and a cryogenic valve downstream of the cryogenic heat exchanger to regulate flow of the cryogenic fuel to an onboard cryogenic fuel tank.

5. The system of claim 1, wherein the cryogenic heat exchanger includes a second flowline to direct the auxiliary flowline to a vaporizer, the vaporizer to convert the cryogenic fuel into a gas.

6. The system of claim 5, wherein the vaporizer includes a flowline to direct the gas to a compressor, the compressor to pressurize the gas, the compressor upstream of a storage tank.

7. At least one non-transitory computer-readable medium comprising instructions that, when executed, cause a controller to at least:

pump, via a submerged transfer pump, a cryogenic fuel from a supply tank upstream of a first valve, submerged transfer pump to increase a vapor pressure of the cryogenic fuel exiting the supply tank; and separate the cryogenic fuel into a primary flowline and an auxiliary flowline by actuating the first valve, wherein the cryogenic fuel in the primary flowline has a first temperature, and wherein the cryogenic fuel in the auxiliary flowline has a second temperature;

reduce the second temperature of the cryogenic fuel in the auxiliary flowline by reducing a saturated pressure in the auxiliary flowline using a second valve;

reduce the first temperature of the cryogenic fuel in the primary flowline by transferring heat from the primary flowline to the auxiliary flowline using a cryogenic heat exchanger;

measure a measured temperature of the cryogenic fuel in the primary flowline downstream of the cryogenic heat exchanger with a temperature sensor; and control at least one of a first position of the first valve or a second position of the second valve to regulate the first temperature;

determine a density of the cryogenic fuel based on the first temperature; and determine a mass of the cryogenic fuel supplied flowing from the cryogenic heat exchanger based on the density, a volumetric flow rate of the cryogenic fuel, and a duration of flow of the cryogenic fuel.

8. The at least one non-transitory computer-readable medium of claim 7, wherein the instructions from the controller are to separate the cryogenic fuel into the primary flowline and the auxiliary flowline by actuating a proportional valve.

9. The at least one non-transitory computer-readable medium of claim 7, wherein the instructions from the controller are to:

measure a volumetric flowrate of the cryogenic fuel with a flowmeter at the primary flowline downstream of the cryogenic heat exchanger; and regulate flow of the cryogenic fuel to an onboard cryogenic fuel tank using a cryogenic valve at the primary flowline downstream of the cryogenic heat exchanger.

10. The at least one non-transitory computer-readable medium of claim 7, wherein the instructions from the controller adjust pressure settings of a vaporizer at the auxiliary flowline downstream of the cryogenic heat exchanger, the vaporizer to convert the cryogenic fuel into a gas.

11. The at least one non-transitory computer-readable medium of claim 10, wherein the instructions from the controller adjust a compression ratio of a compressor at the auxiliary flowline downstream of the vaporizer, the compressor to pressurize the gas, the compressor upstream of a storage tank.

12. A method comprising:

pumping, via a submerged transfer pump, a cryogenic fuel from a supply tank upstream of a first valve, submerged transfer pump to increase a vapor pressure of the cryogenic fuel exiting the supply tank; and separating the cryogenic fuel into a primary flowline and an auxiliary flowline by actuating the first valve, wherein the cryogenic fuel in the primary flowline has a first temperature, and wherein the cryogenic fuel in the auxiliary flowline has a second temperature;

reducing the second temperature of the cryogenic fuel in the auxiliary flowline by reducing a saturated pressure in the auxiliary flowline using a second valve;

reducing the first temperature of the cryogenic fuel in the primary flowline by transferring heat from the primary flowline to the auxiliary flowline using a cryogenic heat exchanger;

measuring a measured temperature of the cryogenic fuel in the primary flowline downstream of the cryogenic heat exchanger with a temperature sensor; and controlling at least one of a first position of the first valve or a second position of the second valve regulate the first temperature;

determining a density of the cryogenic fuel based on the first temperature; and determining a mass of the cryogenic fuel flowing from the cryogenic heat exchanger on the density, a volumetric flow rate of the cryogenic fuel, and a duration of flow of the cryogenic fuel.

13. The method of claim 12, wherein the separating the cryogenic fuel into the primary flowline and the auxiliary flowline includes actuating a proportional valve.

14. The method of claim 12, further including measuring a volumetric flowrate of the cryogenic fuel with a flowmeter at the primary flowline downstream of the cryogenic heat exchanger.

15. The method of claim 12, further including regulating flow of the cryogenic fuel to an onboard cryogenic fuel tank using a cryogenic valve at the primary flowline downstream of the cryogenic heat exchanger.

16. The method of claim 12, further including adjusting pressure settings of a vaporizer at the auxiliary flowline downstream of the cryogenic heat exchanger, the vaporizer to convert the cryogenic fuel into a gas.

17. The method of claim 16, further including adjusting a compression ratio of a compressor at the auxiliary flowline downstream of the vaporizer, the compressor to pressurize the gas, the compressor upstream of a storage tank.

18. The system of claim 1, wherein the fuel tank includes vent valves configured to open during an operation of the submerged transfer pump.

* * * * *